United States Patent Office 2,865,314
Patented Dec. 23, 1958

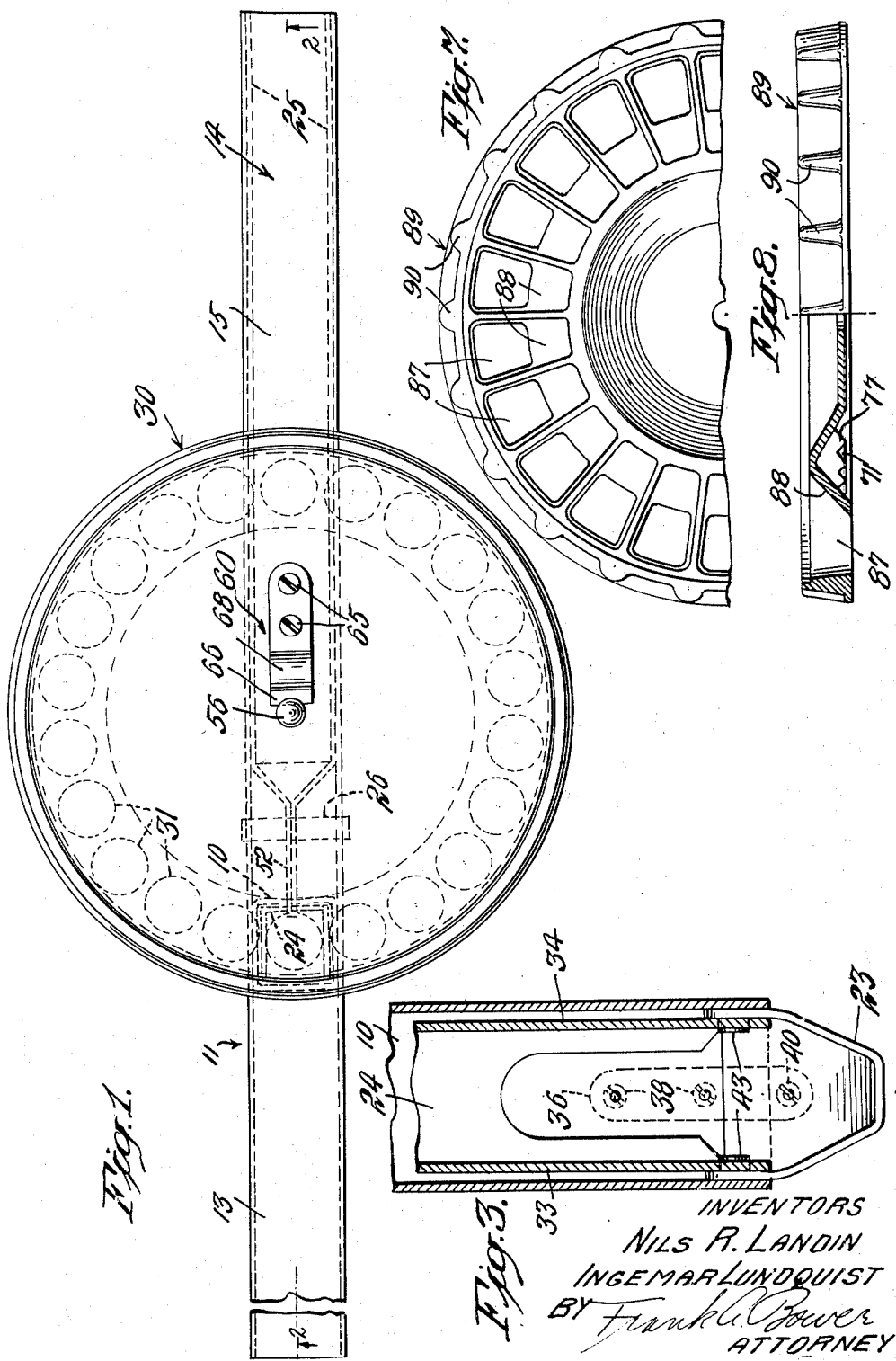

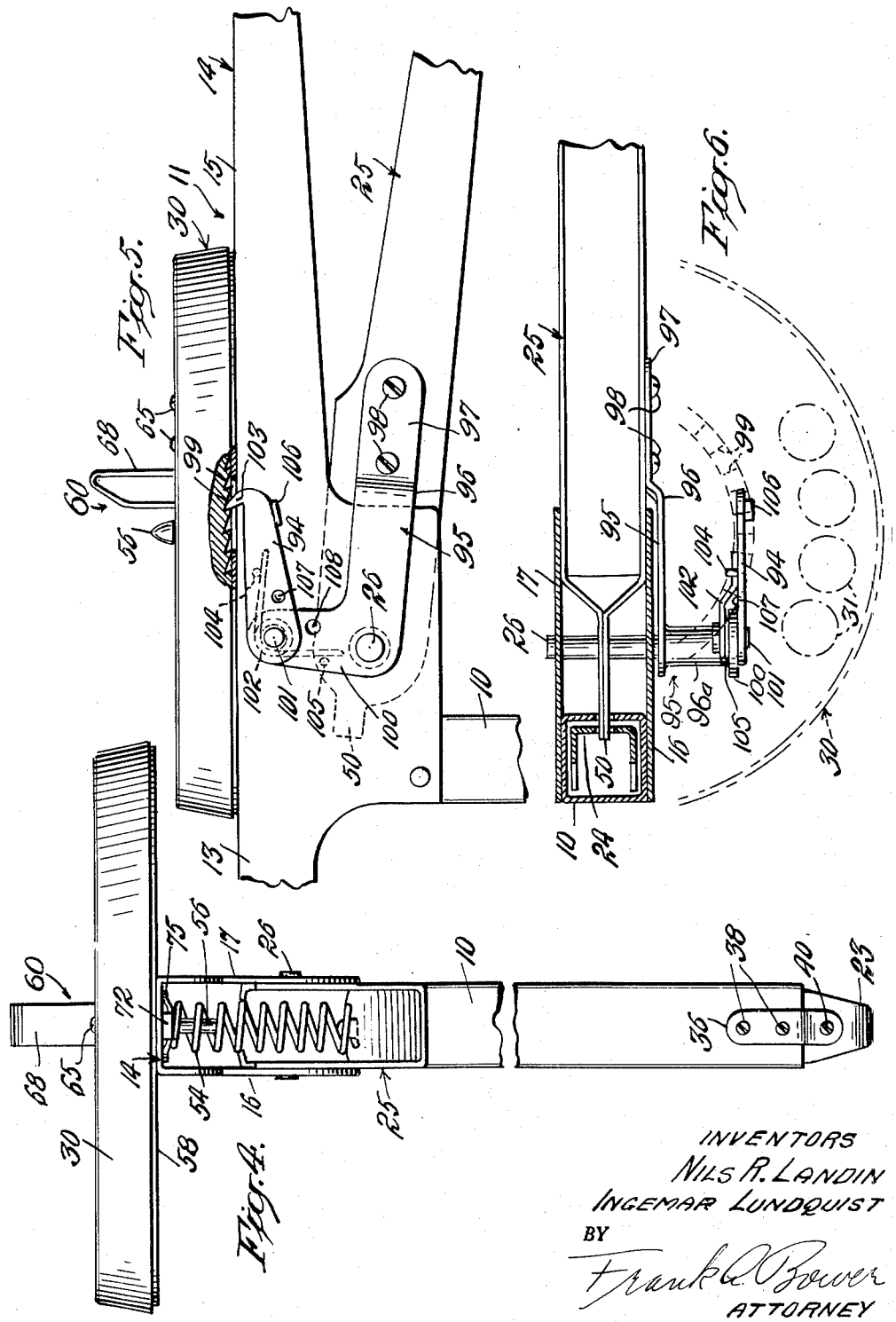

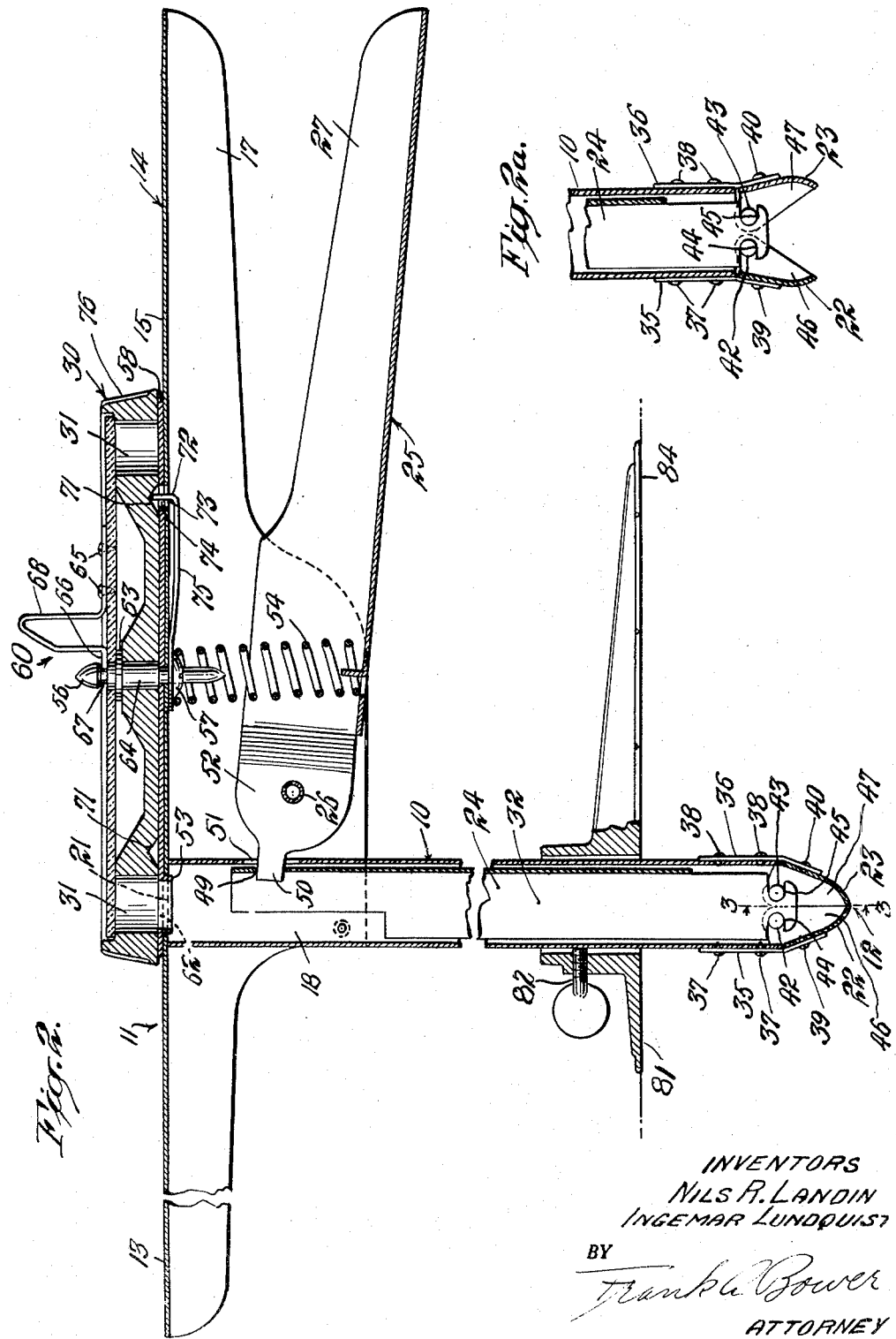

2,865,314

SEED PLANTER

Nils R. Landin, Paterson, and Ingemar Lundquist, East Orange, N. J.

Application June 23, 1953, Serial No. 363,506

3 Claims. (Cl. 111—92)

This invention relates to the manual planting of seeds and particularly to a system and apparatus of the dibble type in which an instrument penetrates the soil and deposits the seed at the proper depth.

An object of the invention is to provide a device operable by the user with a minimum of effort and attention, and which will carry the seed together for instance with an appropriate amount of fertilizer into the required depth in the ground and there deposit it upon withdrawal of the device for repetition at another seeding point.

Another object of the invention is to provide a seed sower that delivers an exact charge of seeds for each planting and for successive plantings a uniform amount of seed is deposited in each hole.

Further objects of the invention, particularly in the effective and convenient supply of the charges for planting and the loosening of the soil for covering the depositing seeds, will appear from the following specification taken in connection with the accompanying drawings in which:

Fig. 1 is a top plan view of the seed sower;

Fig. 2 is a sectional view of the seed sower taken along line 2—2 of Fig. 1;

Fig. 2a illustrates the jaws in an open position;

Fig. 3 is a sectional view of the point taken along lines 3—3 of Fig. 2;

Fig. 4 is an end view of the handle and hand lever;

Fig. 5 is a side view of the seed sower with an automatic indexing of the seed dispenser;

Fig. 6 is a fragmentary top view of the actuating handle;

Fig. 7 is a top view of another embodiment of the seed dispenser; and

Fig. 8 is a side view partially in section of the seed dispenser of Fig. 5.

Referring to the drawings the seed sower has a long narrow shaft 10 attached to the handle 11 at one end and having a penetrating point 12 at the other end. The handle has grips 13, 14 extending on opposite sides of shaft 10 for holding the shaft and forcing it into the soil.

The handle is U-shaped in cross section with a top strip 15 and side strips or walls 16, 17 stiffening the handle and grips. The shaft is tubular and is rectangular in shape with thin walls forming a passage 18 extending its entire length. The upper end of the shaft is fitted in between the side walls 16, 17 and aligned with the opening 21 in the top strip 15. Seed, fertilizer or other granular material dropped through the opening 21 pass down through the tubular shaft to the point 12. The point 12 has two normally closed jaw members 22, 23 which may be separated thus depositing the seed or other material in the soil.

The jaws 22, 23 are actuated by an inner shaft 24 in the passage 18 and extending from the handle end of the shaft 10 to the point 12. At the handle end the shaft 24 is engaged by a hand lever 25. The hand lever fits between the strips 16, 17 and is pivotally held by the pin 26. The lever has a grip 27 extending adjacent the grip 14. When the grips 14 and 27 are squeezed together the hand lever forces the shaft 24 downward opening the jaws 22, 23.

On top of the handle is the seed dispenser or measurer 30. The dispenser has a plurality of holes or chambers 31 which may be circumferentially or arcuately arranged or which may be linearly arranged to register with the opening 21. The seeds are dropped into the shaft and out through the open jaw members 22, 23. In the circumferentially arranged embodiment the chambers or receptacles are successively rotated in position.

The shaft 24 is tubular with walls formed into a U-shape, or it may be cylindrical or angular to correspond to the shape of the shaft 10. The shaft 24 may be rectangularly tubular with a longitudinal passage 32. The shaft 24 has two prongs 33, 34 at the point end connected to the jaws 22, 23. The jaws are connected to the shaft 10 by the hinges 35, 36 comprising flexible metal strips fastened to the walls of the shaft by self-tapping screws 37, 38 respectively and to the jaws by self-tapping screws 39, 40. The upper end of the jaws 22, 23 fit between the walls of the shaft 10 and the prongs 33, 34 and have pins 42, 43 respectively fitting in the sockets 44, 45 of the prongs 33, 34 respectively. When shaft bears down on the pins 42, 43 the jaws turn about on the hinges 35, 36 opening the jaws. The opposing walls 46, 47 of the jaws are at an angle or curved inwardly to form a point when closed. On forcing the dibble into the ground the pressure of the soil on the jaw forces them or holds them in a closed position so that dirt is not pushed up into the passage 18. The pins are spaced from the hinges to provide a sufficient force to open the jaws against the pressure of the soil at the bottom of the hole.

At the handle end the inner shaft 24 has a slot 49 into which the projection 50 of hand lever 25 fits, and the shaft 10 has a lengthwise slot 51 through which the projection 50 extends. The projection 50 is formed by bending the sides of the hand lever together into a strip member 52 with the pin 26 extending through the member 52 and the walls 16 and 17 of the handle. A helical spring 54 is positioned between the top strip 15 of the handle and the bottom strip of the hand lever 25 forcing the grips 14 and 27 apart and raising the shaft 24 to close jaws 22, 23. Thus to open the jaws the grips 14 and 27 are squeezed together compressing spring 54. The projection 50 pivoting about pin 26 forces the inner shaft 24 down to open the jaws. When the grips 14 and 27 are released the spring 54 forces the grips 14 and 27 apart.

The seed dispenser 30 is held on the top strip 15 by the stud 56 and the nut 57. A circular plate 58 is securely held on the handle by the inset 60 and the nut 57 clamping the plate tight against the strip 15. The plate has a hole or opening 62 aligned with the opening 21 and passage 18. A rim or projection 53 is provided fitting in the hole 21 to secure the plate against rotation with the seed dispenser 30. The stud 56 has a rim 63 which holds the dispenser in place. The dispenser fits freely on the stud 56 so that the dispenser will rotate on application of moderate force by the hand. The edge of plate 58 extends beyond the holes 31 to provide stationary bottoms for the holes. The holes are covered by a transparent plastic disc setting on the rim 63. A spring catch 60 is fastened by screws 65 to the disc and has a projection 66 fitting into the annular groove 67 in the stud 56. The catch is U-shaped to form a handle portion 68 for disengaging the projection from the groove 67 and lifting the disc off of the dispenser. The periphery of the disc extends beyond the outer edges of the holes to seal the holes from losing the seed to be deposited. The top of the dispenser has a circumferential bead around the edge to recess the disc.

On the under side of the dispenser are conical indexing recesses 71 for each hole 31. The finger 72 fits into these recesses through the holes or slots 73, 74 in the top strip 15 and plate 58 respectfully. The finger 72 urged and held in the recess by the indexing leaf spring 75 is secured to the underside of the top strip 15 by the stud 56 and the nut 57.

As the dispenser 30 is turned by gripping the outer surface 76 the finger 72 is forced outward by the intermediate portion 77. When the succeeding recess 71 is turned into alignment with finger 72 the spring 75 forces the finger 72 into the recesses to hold the dispenser in alignment. The succeeding hole 31 is then in alignment with the opening 21. The pin in the recess holds the dispenser snugly against any unintentional movement. The dispenser 30 is turned in a step movement with the pin engaging the recess to index the alignment of the holes 21 and 31.

In the preferred embodiment shown in Figs. 5 and 6 a pawl 94 is mounted on the hand lever 25 by means of a bracket 95. The bracket 95 has an attaching arm 96 with a mounting section 97 fastened to the side of the hand lever by screws 98 and an extending portion raised from the side to clear the strip 16 of the handle 11. The arm fits over the end of the pin 26 about which the bracket pivots on actuation of the handle. A mounting arm 100 extends upwardly towards the seed dispenser 30 to support the pawl 94 in a position for drawing the pawl along the teeth 99. A stud 101 is rotatably mounted on the arm 100. The stud 101 has an enlarged portion for carrying a helical spring 102 for forcing the catch 103 of the pawl into the spaces between the teeth 99. The pawl 94 has a projection 104 and the arm has a projection 105 against which the ends of the spring press. When the hand lever is raised or squeezed against the handle the bracket 95 is pivoted and the stud 101 moves substantially parallel to the underside of the seed dispenser. The pawl is pulled turning the seed dispenser to the next indexing position. The seeds drop out of the bottom of the filled compartment into the ground. The hand lever is released closing the jaws 22, 23 and the pawl slides back over the succeeding tooth. The catch 103 then is forced into the succeeding space by the spring 102.

The pawl 94 may be held in a disengaged position by rotating the pawl downward by a grip 106 and snapping the retaining pin 107 in the hole 108. The pin 107 and hole 108 form a retaining means for catching the pawl in a disengaging position. The seed dispenser 30 may then be rotated in either direction independent of the actuation of the handle. The pawl and bracket provide a synchronizing means by which the opening of the jaws and the depositing of the seed occur at substantially the same time. As the catch 103 engages a tooth 99 the projection 50 of the hand lever 25 forces the shaft 24 down to open the jaws 22, 23. Thus, the seed-filled chamber 31 is moved into alignment with the hole 21 and the passage 32 to drop the seeds as the jaws 22, 23 are opened. For each full movement of the pawl the dispenser is turned the distance of one chamber. The indexing finger 72 and recesses 71 hold the chamber 31 in proper alignment as the pawl is slid back for the next planting operation.

A modification of the seed dispenser is shown in Figs. 7 and 8. The holes or chambers 87 are enlarged to provide for a sloping side 88 to increase the ease of loading the chambers with seed or the like. The outer surface of the dispenser 89 has knurls 90 to provide a grip for turning the dispenser. The bottom is serrated with notches 91 to receive the indexing projection for holding the chamber or hole in line with passage 18. The dispenser may be mounted in a similar manner to dispenser in Fig. 1.

The seed dispenser may be used for planting the seeds of the various kinds of flowers which must be deposited in the ground. The seeds are loaded in measured charges into the holes 31 with, if desired, a small quantity of fertilizer to assist in the growth and blooming of the flowers and plant. The grips 13 and 14 are held in the hands and the point 12 of the shaft 10 is pushed into the ground to the desired depth. This depth may be marked on the shaft 10 by a plate 81 fastened to the shaft 10 by the clamp screw 82. The grip 14 of the handle and the grip 27 of the hand lever are squeezed together compressing the spring 54 and forcing the shaft 24 to open the jaws 22, 23. The dispenser may then be turned and a charge of seed moved over the opening 21 and dropped through shaft 10 into the ground. The seed sower may then be removed from the ground holding the jaws 22, 23 open so as not to remove any of the seed.

The charge may be dropped into the closed jaws before the shaft is inserted in the ground or after it is inserted in the ground and before the jaws are open.

The space between plantings may be measured by a notched rod 84. Thus the space between plantings and the depth of the plantings may be readily determined and a row of seedings may be planted with a minimum effort and time.

It is important, and particularly so, for relatively compact soil conditions that the penetrating pressure be concentrated in a relatively small area and the lower entering-in of the device is limited to a total cross-sectional area in the order of one-half to one square inch. This, with the long taper of the lowermost point, provides an easy entry of desired depth and correspondingly avoids an over-compacting of the soil at the surfaces of the hole. As the pivoted jaws are open to deposit the seed, the device is eased upward to clear the deposited charge and make ready for the reception of the next charge.

It is also important to provide for the covering over of the planted seed and this is effected by a rotary or twisting motion of the device as it is withdrawn. The outer shaft 10 is of an angular formation, for instance rectangular or triangular. The turning of the device will cause the corners of the lower end to scrape off soil in loose condition to drop over the seeds at the bottom of the pole. This twisting motion is expedited and made easy by the limited cross-sectional area of the lower penetrating end so that both the insertion and deposit and the withdrawal and loosening of the soil is very readily and expeditiously effected.

The edges or corners of the shaft 10 are at a greater distance from the center than the walls. As the device is turned the edges subscribe arcs that extend into the wall of the hole. Thus by pressing the shaft 10 into the soil, squeezing the grips 14 and 27, twisting the sower, and pulling shaft 10 from the soil the seed is rapidly and easily deposited in the ground. The sower is then moved to the next position measuring the distance with the notched rod 84 and inserted repeating the seeding operation. A row of deposits may be made at a uniform depth and spacing with a uniform charge of seed in each deposit.

If a variation of flowers are desired the chambers 31 in the dispenser may be filled alternately with different seed. The seeds will then be alternately deposited in the desired order easily and simply without concern. Instead of loose seed being measured into the chambers 31 a strip or roll of seeds packaged in individual compartments may be used with the individual compartments or packages severed and deposited in the ground.

The shaft 10 stands the handle generally at waist high so that the sower may be pressed into the soil without bending. The sower may have a support with a spring. The support rests on the ground and when the shaft 10 is forced into the ground the spring is compressed. The spring then automatically returns the shaft in the appropriate manner. The sower is light in construction and easily carried and manipulated. The parts may be stamped or drawn so that they are light and strong.

Various other modifications and changes may be made without departing from the scope of the invention.

We claim:

1. A seed sower comprising a rectangular tubular shaft, a pair of normally closed jaw members forming a point for inserting said shaft into soil, spring hinges mounting said jaw members on said shaft and urging said jaw members together, a second shaft having a passage extending longitudinally therethrough said first shaft and pivotally connected to said jaw members to swing said jaw members apart against the spring hinges to open the end of said passage, a seed dispenser mounted at the opposite end of said first shaft having a seed carrier with a plurality of evenly spaced circumferentially spaced chambers, said chambers being positioned at the other end of the shaft to readily receive a given quantity of seed not greater than the maximum volume of the chamber, a circular disc under said seed chambers, to form a bottom for said chambers to retain seed therein, said seed carrier having ratchet teeth indexed with said chambers an opening in said disc aligned with said first shaft and the chambers as successively presented to drop the said given quantity of seeds into said passage, a pivotally mounted hand lever having a projection engaging said second shaft for moving said second shaft longitudinally within said first shaft, a bracket mounted on said hand lever with a pawl moved along said seed dispenser having ratchet teeth engaged by said pawl to turn said seed dispenser one chamber with the opening of the jaw members to successively and automatically drop the seed and open the jaw members for delivery of said seed to the soil.

2. A seed sower comprising a first tubular shaft having a passage extending therethrough, a pair of normally closed jaw members mounted on said shaft and forming a point for inserting said shaft into soil, spring means engaging said jaw members for urging said jaw members together, a second tubular shaft having a passage extending longitudinally therethrough said first tubular shaft pivotally connected to said jaw members to swing said jaw members apart against the resiliency of said spring means to open the end of said passage, a seed dispenser movably mounted at the opposite end of said first shaft and having a plurality of spaced chambers movable in a plane lateral to said first tubular shaft, said chambers adapted to receive a given quantity of seed not greater than the maximum volume of the chamber, means for moving said seed carrier to successively index said chambers over said first tubular shaft to bring said chamber in communication with said passage for delivering the said given quantity of seeds to the other end of said first shaft, movable means mounted on the exterior of said first tubular shaft and having means extending through said tubular shaft to engage said second tubular shaft and move said second shaft longitudinally within said first shaft to separate said jaw members and having an actuating means separate from said shaft engaging means for engaging said index means to shift said seed dispenser with the opening of said jaws to deposit seed in the hole formed by said jaw members.

3. A seed sower comprising a first tubular shaft, a pair of normally closed jaw members forming a point for inserting said shaft into soil, spring means mounted on said jaw members for urging said jaw members together, a second shaft having a passage extending longitudinally therethrough said first shaft and pivotally connected to said jaw members to swing said jaw members apart against the spring means to open the end of said passage, a seed dispenser mounted at the opposite end of said first shaft having a seed carrier with a plurality of spaced chambers, said chambers being positioned at the other end of the shaft to readily receive a given quantity of seed not greater than the maximum volume of the chamber, a plate under said seed chambers to form a bottom for said chambers to retain seed therein, said seed carrier having ratchet teeth indexed with said chambers, an opening in said disc aligned with said first shaft and the chambers as successively presented to drop the said given quantity of seeds into said passage, a pivotally mounted hand lever having a projection engaging said second shaft longitudinally within said first shaft, a bracket mounted on said hand lever with pawl means moved along said seed dispenser having ratchet means engaged by said pawl means to move said seed dispenser one chamber with the opening of the jaw member to successively and automatically drop the seed and open the jaw member for delivery of said seed to the soil.

References Cited in the file of this patent

UNITED STATES PATENTS

| Number | Name | Date |
|---|---|---|
| 75,843 | Bergstresser | Mar. 24, 1868 |
| 106,568 | Dyer | Aug. 23, 1870 |
| 257,820 | Horton | May 9, 1882 |
| 287,162 | Records | Oct. 23, 1883 |
| 845,200 | Schauer | Feb. 26, 1907 |
| 977,115 | Markley | Nov. 29, 1910 |
| 1,253,621 | Martinson | Jan. 15, 1918 |
| 1,792,763 | Ryan | Feb. 17, 1931 |
| 2,230,846 | Pettet | Feb. 4, 1941 |
| 2,438,843 | Correa | Mar. 30, 1948 |

FOREIGN PATENTS

| Number | Country | Date |
|---|---|---|
| 930,266 | France | Aug. 4, 1947 |